Figure 1:
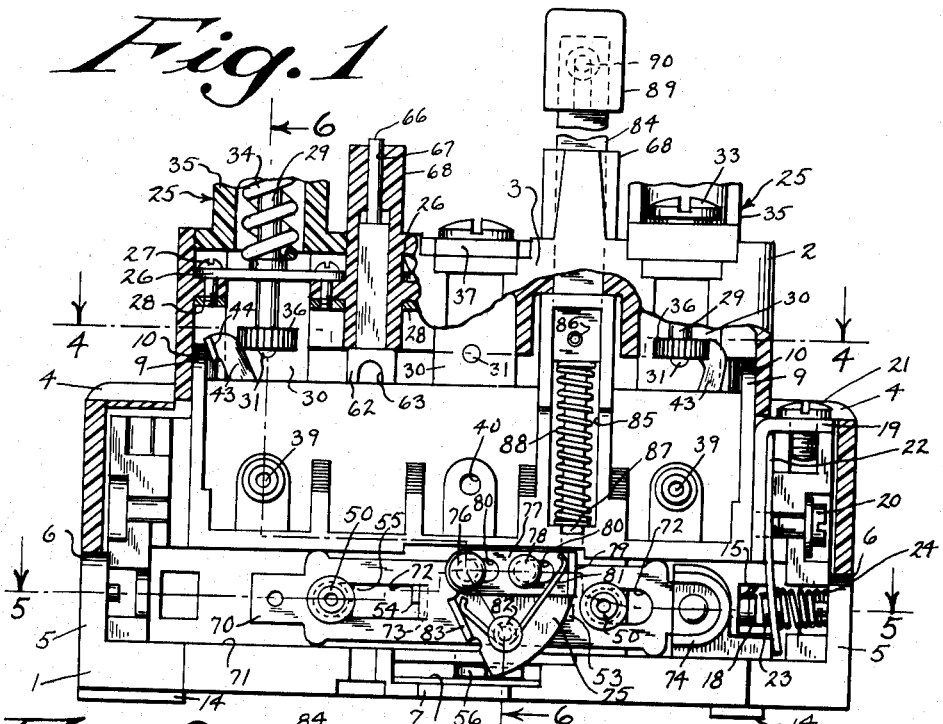

Dec. 14, 1965    R. E. WALTERS    3,223,803
MULTI-POLE PROTECTIVE RELAY
Filed March 21, 1962    7 Sheets-Sheet 1

INVENTOR
ROBERT E. WALTERS

BY Allan W. Leiser

ATTORNEY

Dec. 14, 1965                R. E. WALTERS                3,223,803
                       MULTI-POLE PROTECTIVE RELAY
Filed March 21, 1962                                    7 Sheets-Sheet 2
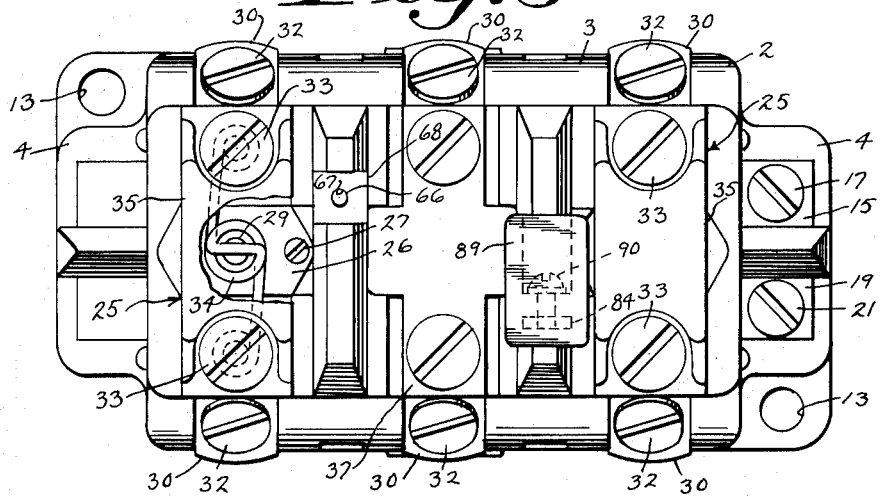
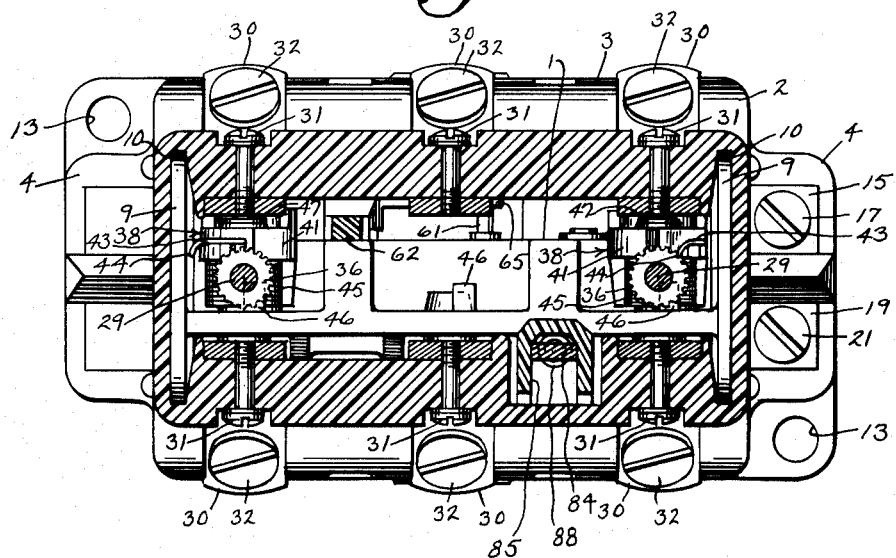
INVENTOR
ROBERT E. WALTERS
BY  *Allan W. Leiser*
ATTORNEY Dec. 14, 1965

R. E. WALTERS 3,223,803

MULTI-POLE PROTECTIVE RELAY

Filed March 21, 1962

7 Sheets-Sheet 3

INVENTOR
ROBERT E. WALTERS

BY Allan W. Laim

ATTORNEY

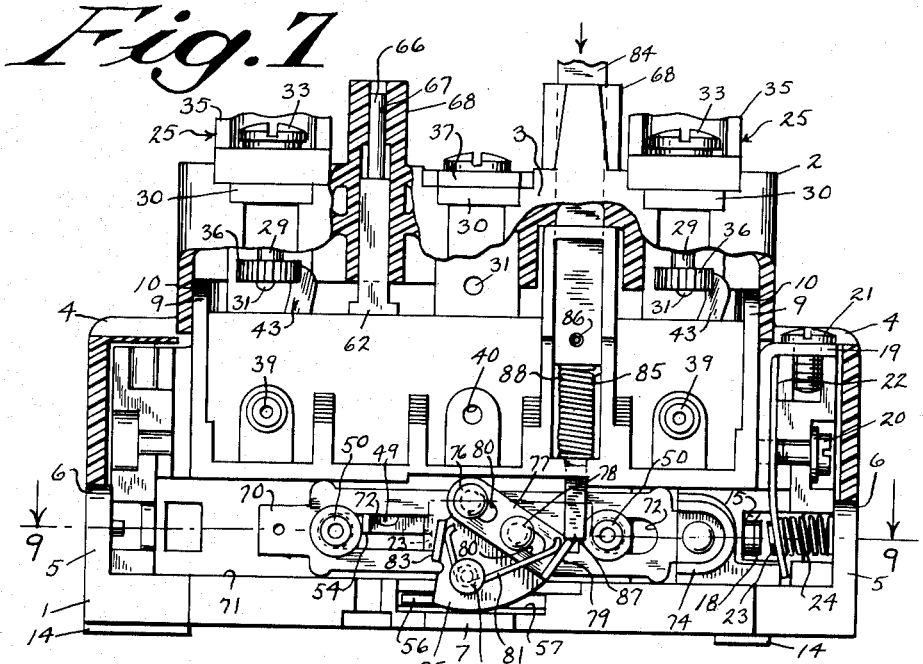

Dec. 14, 1965   R. E. WALTERS   3,223,803
MULTI-POLE PROTECTIVE RELAY
Filed March 21, 1962
7 Sheets-Sheet 5

INVENTOR
ROBERT E. WALTERS

BY *Allan W. Leiser*

ATTORNEY

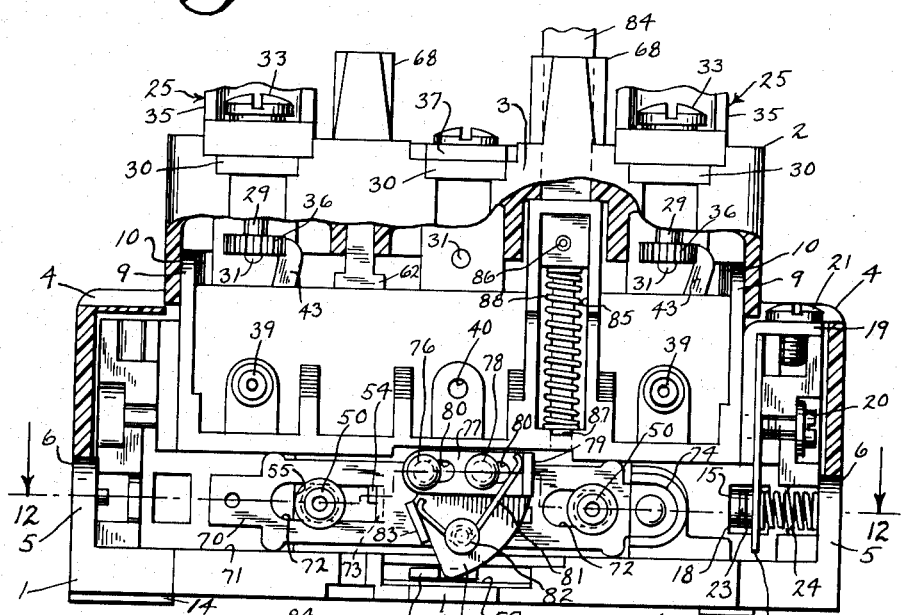
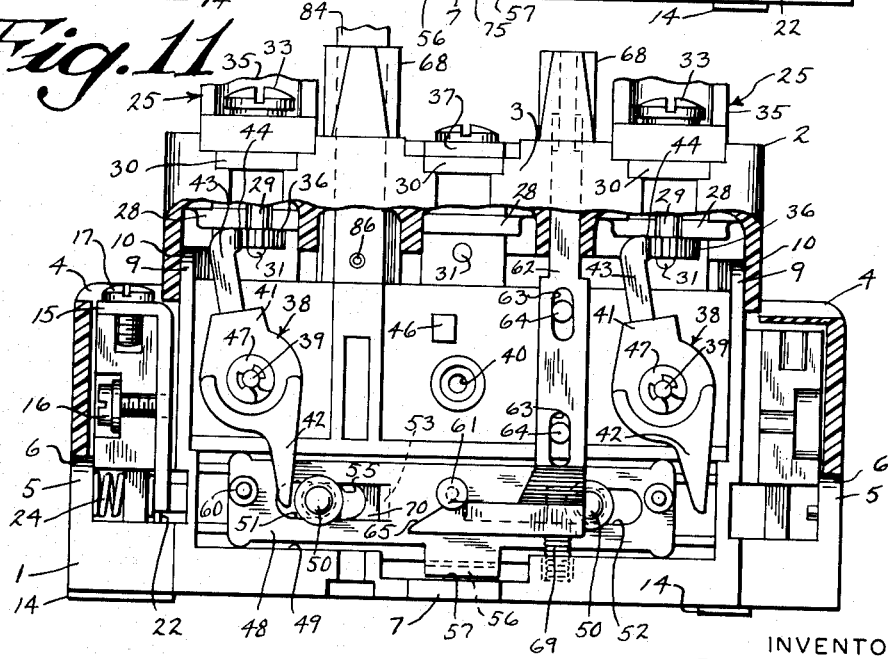

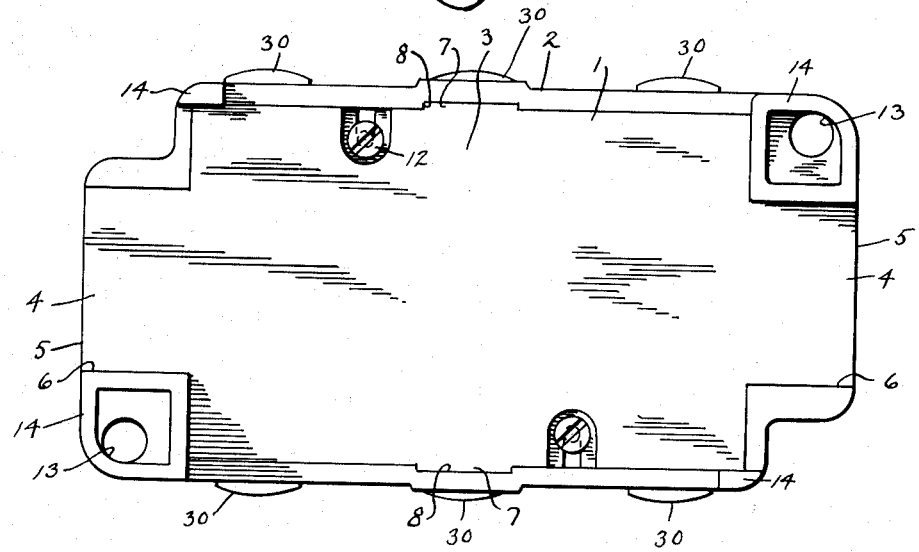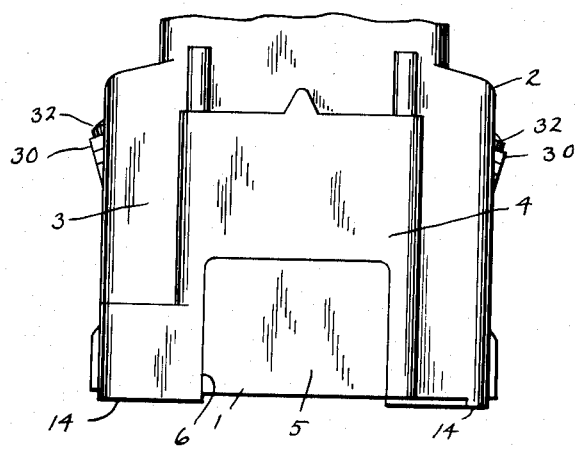

United States Patent Office 3,223,803
Patented Dec. 14, 1965

3,223,803
MULTI-POLE PROTECTIVE RELAY
Robert E. Walters, Bayside, Wis., assignor to Allen-Bradley Company, Milwaukee, Wis., a corporation of Wisconsin
Filed Mar. 21, 1962, Ser. No. 181,418
8 Claims. (Cl. 200—116)

This invention relates to protective relays; and it more particularly resides in a trip-free, tamper-free relay construction in which a single tripping and reset mechanism is arranged to respond to and act upon any one or more of a number of tripping devices.

Protective relays have of course many well-known uses, and one particularly common use is in motor control circuits having electromagnetic line contactors. In such use, the relay is usually provided with a thermal unit responsive to motor load conditions, and the relay contacts are incorporated in a control circuit for the actuator of the line contactor. In the presence of an overload, a relay action is initiated that opens the line contactor, and when the overload condition has been corrected the relay may be reset so that operation can be resumed.

Although a great number of relay constructions have been devised which operate more or less satisfactorily to accomplish the desired end result, most old relay constructions are unsatisfactory in that they are subject to accidental or intentional interference. Thus, most old relays are not trip-free in that it is possible by manipulating one element or another to prevent the relay contacts from opening or to hold them closed in the presence of an overload or other tripping condition. Similarly, most old relay constructions are not tamper-free in that it is possible by manipulation to cause the relay contacts to be opened without a tripping condition having occurred.

Previously devised relays are also unsatisfactory in certain applications since they are generally designed to respond to tripping conditions in only a single electrical line or the like. Thus, when it is required in the interests of safety or because of customer specifications to have, for example, a polyphase motor control circuit open in the event of an overload in any one of the power lines, it is necessary to use two or more separate relays, one for each line. It will be readily apparent that the use of several relays can present a serious cost problem both to the manufacturer of motor control units and to the customer. Vexing space and/or arrangement problems can also result when it is desired, for example, to mount a contactor and several associated relays in an enclosure or on a panel of limited size. Further, it may be difficult in the event of a work stoppage to determine which of several relays may have tripped thus making resetting a hit-or-miss proposition or making necessary the use of cumbersome multiple relay resetting bars or the like.

A fully satisfactory trip-free, tamper-free relay construction is shown and described in the co-pending application of Robert E. Walters, Serial No. 32,250, now Patent No. 3,096,415. It is the general object of this invention to provide a relay construction of that type but which is specifically designed so that the means for actuating the trip member of the mechanism may constitute any one or more of a number of condition-responsive tripping devices.

It is another object of this invention to provide such a construction that is compact, sturdy, effective and relatively inexpensive to manufacture.

It is a further object of this invention to provide a two-part protective case construction for such a relay in which a base member mounts the elements of the relay mechanism proper for simple assembly, inspection and repair and a cover member mounts line connection terminals and thermal units or the like for simple installation and replacement, the base and cover being provided with keys and keyways for easy assembly and to insure that base, cover and relay elements are located and held in their proper orientation.

It is still another object of this invention to provide a construction in which a trip member and an actuator are both biased toward their normal positions by a single bias means for simple construction and to insure that these elements are returned to their proper places even after the relay has been subjected to long-continued use.

It is a still further object of this invention to provide a construction wherein a trip member is acted upon by one or more tripping devices and also operates to move the tripping devices toward their normal or withdrawn positions, there being an overtravel of the trip member to insure proper resetting of the tripping devices, which overtravel also allows for acceleration space for the tripping devices to insure a snap action.

It is still another object of this invention to provide a tripping device construction in which a bias means for the tripping device also serves to hold certain elements of the tripping device in place.

Other objects and advantages will become apparent from the description to follow. In the description reference is made to the accompanying drawings, forming a part hereof, in which there is shown by way of illustration and not of limitation a specific embodiment of the invention.

Figure 2:
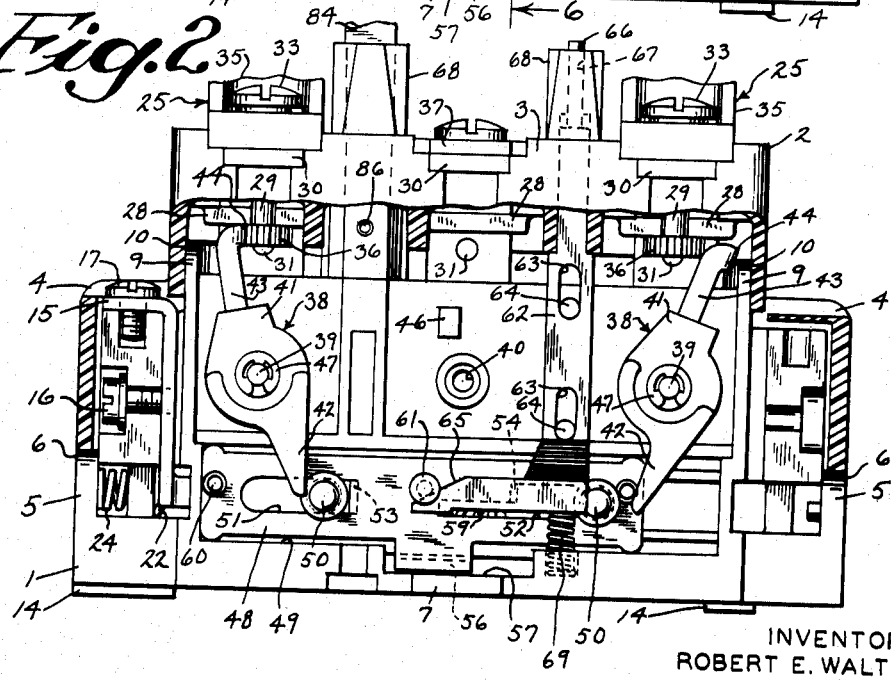
Figure 5:
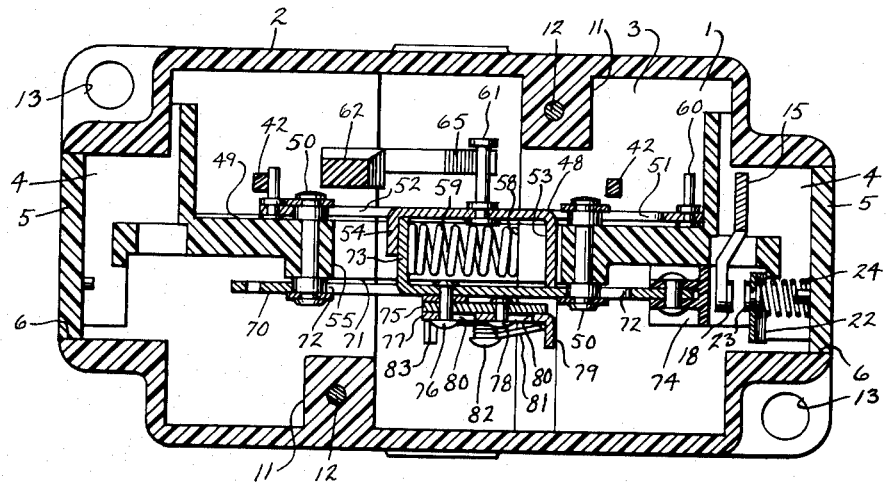
Figure 6:
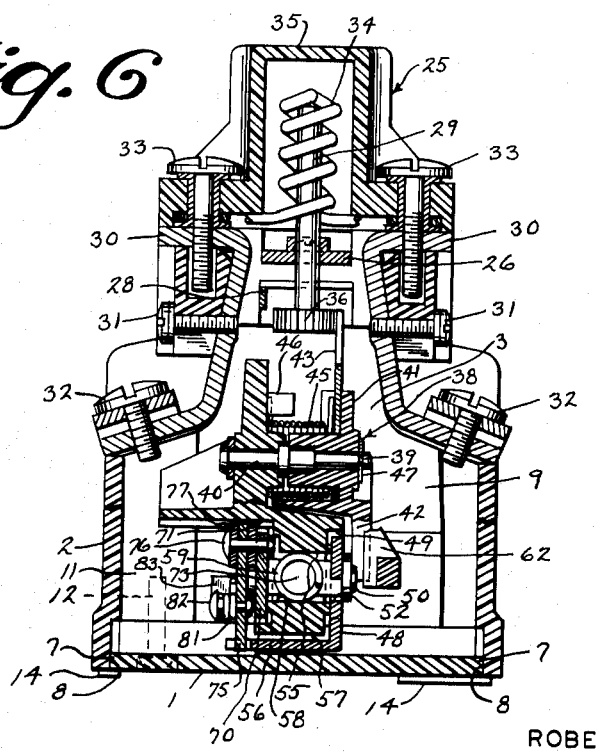
Figure 9:
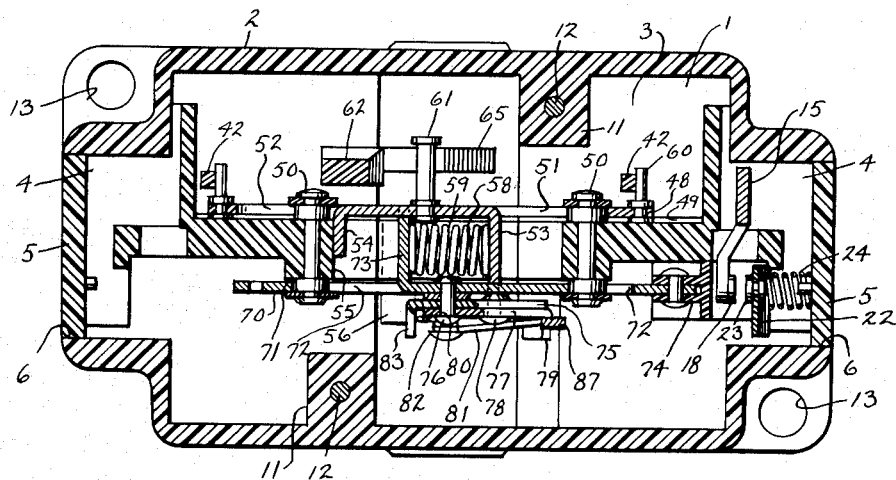
Figure 12:
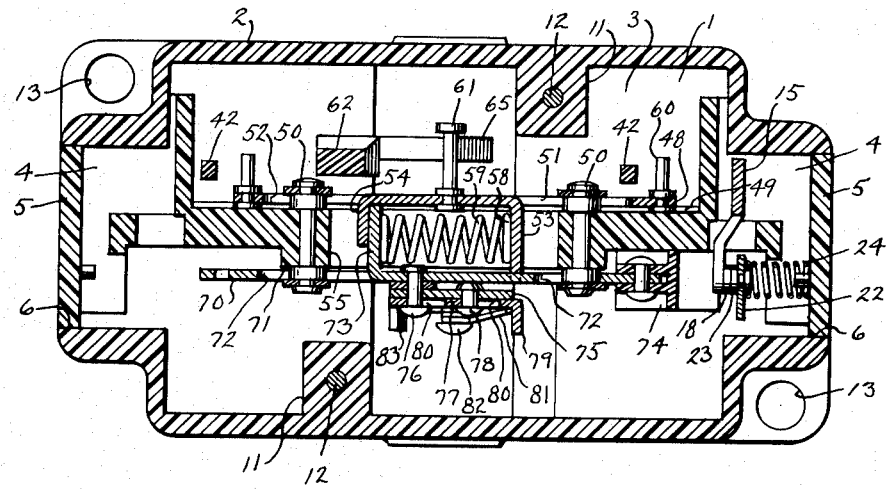

In the drawings:

FIG. 1 is a front view in elevation, with parts broken away and in section, of a relay formed according to this invention in which the various elements are shown in the positions assumed subsequent to a tripping action, FIG. 2 is a rear view in elevation, with parts broken away and in section, of the relay of FIG. 1, FIG. 3 is a top plan view, with a part broken away, of the relay of FIG. 1, FIG. 4 is a view in cross-section of the relay of FIG. 1 taken along the plane 4—4 indicated therein, FIG. 5 is a view in cross-section of the relay of FIG. 1 taken along the plane 5—5 indicated therein, FIG. 6 is a view in cross-section of the relay of FIG. 1 taken along the plane 6—6 indicated therein, FIG. 7 is a front view in elevation, with parts broken away and in section, similar to FIG. 1 but with the elements of the relay being shown in the positions assumed just prior to the completion of a resetting action, FIG. 8 is a rear view in elevation with parts broken away and in section, of the relay of FIG. 7, FIG. 9 is a view in cross-section of the relay of FIG. 7 taken along the plane 9—9 indicated therein, FIG. 10 is a front view in elevation, with parts broken away and in section, similar to FIG. 1 but with the elements of the relay being shown in the positions assumed after the completion of a resetting action and prior to a tripping action, FIG. 11 is a rear view in elevation with parts broken away and in section, of the relay of FIG. 10, FIG. 12 is a view in cross-section of the relay of FIG. 10 taken along the plane 12—12 indicated therein, FIG. 13 is bottom plan view of the relay of FIG. 1, and FIG. 14 is a fragmentary side view in elevation of the relay of FIG. 1.

Referring again to the drawings, and specifically to FIGS. 1, 4, 5, 6, 13 and 14, it can be seen that the relay mechanism of the invention is enclosed in a protective case preferably formed of an insulating material such as a phenol formaldehyde molding compound and comprising a base 1 and a cover 2. The case as a whole includes a central relay mechanism housing portion 3 and contact housing portions 4 on either end.

The base 1 forms a bottom wall or floor for the case as a whole, and is surrounded on all sides by the downwardly extending walls of the cover 2 except at the outer ends of the contact housing portions 4 where the base 1 extends outwardly through the walls of the cover 2 to present generally rectangular portions 5 received in cutout portions 6 formed in the cover 2. The base 1 is also provided with projections 7 which are received in recesses 8 formed in the cover 2. The portions 5 and projections 7 constitute keys and the cutout portions 6 and recesses 8 constitute keyways, the keys and keyways serving to locate and hold the base 1 in place with respect to the cover 2. Also the end portions 5 serve as a convenient means to grasp and hold the base 1 while it is being inserted into or removed from the cover 2.

The base 1 extends upwardly into the cover 2 to present vertical tongues 9 near each end which are received in complementary slots or grooves 10 formed in the cover 2. The tongues 9 and grooves 10 also constitute keys and keyways for locating and holding the base 1 and cover 2 in proper orientation.

The cover 2 extends inwardly to present platforms 11 which have threaded openings to receive assembly screws 12 which hold the base 1 and cover 2 together. The cover 2 also extends outwardly to present openings 13 useful for mounting the relay. About the openings 13 and at the opposite corners of the case the cover 2 extends downwardly to provide feet 14 which serve to hold the case slightly off of a surface on which it may be mounted.

Referring now to FIGS. 3, 10, 11 and 12, it can be seen that a stationary contact terminal 15 is mounted, by a mounting screw 16, on the base 1 at the right-hand portion 4 as seen in FIG. 10. The terminal 15 extends outwardly through an opening in the cover 2 to receive a terminal screw 17 for connection into a control circuit and also extends downwardly and forwardly, as seen in FIG. 10, to present a stationary contact 18. A movable contact terminal 19 is mounted forwardly of the terminal 15, as seen in FIG. 10, by a mounting screw 20 and also extends through an opening in the cover 2 to receive a terminal screw 21 for connection into the control circuit. A resilient extension 22, formed of a resilient, electrically conductive sheet material, is fastened securely to the terminal 19 and extends downwardly to present a movable contact 23. A spring 24, operating between the resilient extension 22 and the base portion 5 serves normally to hold the movable contact 23 in closed position with the stationary contact 18.

Referring now to FIGS. 1, 3, 4 and 6, it can be seen that two thermal units indicated generally at 25 are mounted atop the cover 2. The units 25 each include a molded base 26 which is mounted on the cover 2 by means of screws 27 received in threaded openings of a metal bracket 28 disposed on the underside of the cover 2. A hollow, heat conducting stud 29 passes through and extends above and below the base 26 and has a crimped connection with the base 26 to prevent rotation. Line terminals 30 are secured on either side of the stud 29 by means of mounting screws 31 and extend downwardly and outwardly through either side of the cover 2 to receive terminal screws 32 for line connections.

The terminals 30 also extend upwardly and through the cover 2 to receive terminal screws 33 which mount the ends of a resistance coil 34. The coil 34 electrically bridges the gap between the terminals 30 and encircles the upwardly extending portion of the stud 29 whereby the heat transfer from the coil 34 to the stud 29 is a measure of the load current passing through the terminals 30. A molded, insulating case 35 formed of any suitable material is also mounted by the terminal screws 33 and serves to enclose the stud 29 and coil 34 and protect against air currents.

A rotatable ratchet 36 is mounted on the downwardly extending portion of the stud 29 and is normally prevented from rotation with respect to the stud 29 by means of a film of a heat fusible alloy, such as eutetic solder, occupying the clearance therebetween. When the heat transferred to the stud 29 from the coil 34 is sufficient to melt the fusible alloy, the ratchet 36 will be freed to rotate thus providing an indication of an overload. As is well known, the composition and configuration of the stud 29 and coil 34 and the fusible alloy can be selected to provide for release of the ratchet 36 at any desired current.

The particular embodiment of the invention shown herein is a relay for incorporation into a three-phase motor control but is provided with only two thermal units 25, none being provided for the central, neutral wire. The cover 2 and base 1 are adapted to receive a third thermal unit, but in this specific embodiment the missing third unit is replaced by a bus bar 37 extending between the terminal screws 33. It should be readily apparent, therefore, that a third unit 25, or in fact as many units as may reasonably be desired, can be added without departure from the invention.

Referring now to FIGS. 6 and 10 through 12, it can be seen that a tripping device indicated generally at 38 is pivotally mounted on the base 1 below each thermal unit 25, by means of a shaft 39 securely mounted and held against rotation in any suitable manner in an opening 40 formed in the base 1.

Each tripping device 38 includes a body portion 41 mounted on the shaft 39 and preferably formed of a molded insulating material such as a phenol formaldehyde and including an integrally formed, downwardly projecting operating arm 42. A resilient metal pawl 43 is also mounted on the shaft 39 and disposed within a complementary recess formed in the body 41, the pawl 43 extending upwardly to present an inwardly turned pawl ear 44 that is engageable with the ratchet 36.

A torsion spring 45 is disposed about the shaft 39 between the base 1 and pawl 43, with one leg of the spring 45 being held by a holding projection 46 and the other leg being held in a recess formed in the body 41. The spring 45 urges the body 41, and arm 42, in a clockwise direction as seen in FIG. 11. The body 41 is, however, normally held in a counterclockwise rotated position, seen in FIG. 11, by the engagement of the pawl ear 44 with the ratchet 36, this position being termed a latched or withdrawn position. In the presence of an overload, the ratchet 36, which functions as a releasable catch, is freed to rotate thus freeing the pawl ear 44, which acts as a latch, so that the spring 45 can move the body 41 in a clockwise direction as seen in FIG. 11 to what is termed an operating position, this movement being limited by an operative engagement with a trip member as will be hereinafter described.

The body 41 is held on the shaft 39 by means of a clip washer 47 disposed in an annular recess adjacent the end of the shaft 39. The spring 45 is made so that it is held in an axially compressed position between the pawl 43 and base 1 whereby, in addition to acting as a torsion spring, it acts as a compression spring to hold the pawl 43 and body 41 tightly against the washer 47.

Referring now to FIGS. 10 through 12, it can be seen that a generally rectangular trip member 48 is slidably mounted in a shallow but wide track 49 formed in the base 1. The trip member 48 is guided and limited in its sliding motion both by the track 49 and by pins 50 which pass through slots 51 and 52 formed in the trip member 48.

The trip member 48 is also provided with inwardly turned ears 53 and 54 which project into a central slot 55 formed in the base 1, and with an inwardly turned tongue 56 that extends through a slot 57 formed in the base 1 below the slot 55.

As can be seen most clearly in FIG. 6, the slot 55 has a central portion 58 of a greater vertical dimension that forms a cage for a compression spring 59. The spring 59, operating in a manner to be described, tends to normally hold the trip member 48 in the position shown in FIGS.

11 and 12 which is termed its cocked position. From its cocked position, the trip member 48 is movable to the right to the position shown in FIG. 8 so as to have an overtravel during a resetting action as will be described, and is also movable to the left or toward what is termed its tripped position, seen in FIG. 2, as will also be described.

The trip member 48 is also provided with relatively short projections in the form of pins 60 extending outwardly adjacent each of its ends and with a relatively long outwardly extending central pin or projection 61. The pins 60 are in the path of movement of and normally spaced from the corresponding operating arms 42 of the tripping devices 38, with the inner portion of the pin 61 being adapted to serve the same purpose with respect to a third tripping device if one is desired. Thus, when the presence of an overload frees one or both tripping devices 38, the arm 42 of the freed device 38 will, in response to the relatively strong spring 45, be moved to the operating position shown in FIG. 2 in the course of which the arm 42 will engage the corresponding pin 60 to move the trip member 48 to its tripped position, also seen in FIG. 2. The space, seen in FIG. 11, between the pins 60 and arms 42 when the tripping devices 38 are in latched position and the trip member 48 is in cocked position provides room for a freed arm 42 to accelerate thus insuring a snap action.

Referring to FIGS. 11 and 12, it can be seen that a generally L-shaped indicator 62 is vertically reciprocably mounted on the base 1 by means of slots 63 formed in its vertical leg through which are received pin-like projections 64 formed in the base 1. The indicator 62 can be formed of any suitable material such as nylon, and is preferably of a color clearly contrasting with the color of the cover 2.

The horizontal leg of the indicator 62 is provided with an inclined cam surface 65 that is engageable with the outer portion of the pin 61. The upper portion 66 of the vertical leg of the indicator 62 is of reduced diameter and is disposed within an opening 67 formed in one of a pair of upstanding separators 68 formed in the cover 2 between the thermal units 25. A spring 69, seated on the base 1, serves to urge the indicator 62 upwardly as seen in FIG. 11.

The indicator 62 serves to indicate visually the position of the trip member 48, and thus serves to indicate whether the relay has tripped. When the trip member 48 is in cocked position as seen in FIG. 10, the pin 61 holds the indicator 62 downwardly against the spring 69 so that the portion 66 is withdrawn within the opening 67. When, however, the trip member 48 moves to the tripped position shown in FIG. 2, the pin 61 is moved therewith to allow the spring 69 to move the indicator 62 upwardly so that the portion 66 extends through the opening 67 and outwardly of the cover 2 where it is readily visible. In a resetting action, when the trip member 48 is moved to the right as seen in FIGS. 2, 8 and 11, the pin 61 acts on the camming surface 65 to move the indicator 62 downwardly to the position of FIG. 10.

Although the indicator construction shown herein is particularly suitable, it forms no part of the invention as such since no indicator need be provided. The structure and advantage of such an indicator construction are more fully described and claimed in the co-pending application of Gerd C. Boysen, Serial No. 145,005. Suffice it to note herein that the indicator construction contributes to complete trip-free and tamper-free properties, when an indicator is used, since depression of the indicator 62 acts only on the spring 69 and has no effect on the elements of the relay mechanism proper.

Referring now to FIGS. 10 and 12, it can be seen that a generally rectangular actuator 70 formed of sheet material is slideably mounted in a track 71 formed on the opposite side of the base 1 from, and parallel to, the track 49. The pins 50 pass through the base 1 and slots 72 formed in the actuator 70 to serve to guide and limit the actuator 70 in its sliding movement. The actuator 70 is also provided with an inwardly turned ear 73 which lies between the spring 59 and the trip member ear 54. A tongue member 74, formed of a suitable insulating material such as nylon, is attached to the right-hand end of the actuator 70 as seen in FIG. 10 and this is adapted to slide under the stationary contact 18 to engage a downward extension of the resilient portion 22 of the movable contact terminal 19.

The position of the actuator 70 seen in FIG. 10 is termed its retracted position in which the member 74 is withdrawn from the movable contact structure. As will be hereinafter described, the actuator 70 is movable from its retracted position to an actuating position, seen in FIG. 1, in which the member 74 engages the portion 22 to move the movable contact 23 to an open position with respect to the stationary contact 18.

Referring again to FIGS. 10 and 12, it can be seen that a generally triangular cocking lever 75, formed of sheet material, is pivotally mounted at one apex on the actuator 70 by means of a pin 76. A cocking arm 77 is mounted on the lever 75 by means of the pin 76 and a second pin 78, and is provided with an outwardly turned portion or finger 79. Because of the pins 76 and 78, the arm 77 is held against pivotal motion with respect to the lever 75, but the arm 77 is provided with slots 80 through which the pins 76 and 78 pass to allow for some sliding movement of the arm 77 with respect to the lever 75 for a purpose to be hereinafter described. A grasshopper spring 81 centered on a pin 82 mounted on the lever 75 with its legs seated on the finger 79 and an outwardly turned ear 83 formed in the lever 75 serves normally to hold the arm 77 in the position of FIG. 10 where the pins 76 and 78 are at the left ends of the slots 80. The lower apex of the lever 75, as seen in FIG. 10, is engageable with the trip member tongue 56.

Referring again to FIGS. 10 and 12, a reset lever 84 is vertically reciprocably mounted in a cage 85 formed in the base 1, being guided and limited in its movement by the walls of the cage 85 and a hollow pin 86 passing through the lever 84 with its rear portion slidable in a groove (not shown) formed in the back wall of the cage 85. The lever 84 includes a bottom portion or finger 87 that passes through the bottom wall of the cage 85, and a spring 88 disposed about the finger 87 and seated on the bottom wall of the cage 85 serves to normally urge the lever 84 upwardly as seen in FIG. 10. The lever 84 also extends upwardly above the cover 2 through one of the separators 68, and a manually engageable cap 89 is releasably secured to the top of the lever 84 by means of an assembly screw 90.

In operation, the various elements of the relay mechanism normally assume the positions shown in FIGS. 10 through 12. Thus, the tripping devices 38 are held in their latched positions against the springs 45 by the engagements of the pawl ears 44 with the ratchets 36, the arms 42 then being spaced from the pins 60. The tripping devices 38 remain in their latched positions so long as the fusible alloy holding the ratchets 36 against rotation remains in a solid state.

Also, the spring 59 has moved the trip member 48 to its cocked position and the actuator 70 to its retracted position. That is, referring to FIG. 12, the spring 59 has expanded to fill the cage 58 and operates between the right-hand end of the cage 58 and the actuator ear 73 to move the actuator 70 to the left or to retracted position and operates between the left-hand end of the cage 58 and the trip member ear 53 to move the trip member 48 to the right or to cocked position, the trip member ear 54 thereby being brought up against the actuator ear 73. The trip member tongue 56 rests against the cocking lever 75 in this position.

With the trip member 48 in cocked position, the indicator 62 is held against the spring 69 by the pin 61 in a withdrawn position as hereinbefore described.

With the actuator 70 in retracted position, the cocking lever 75 and arm 77 are in a position to the left, as seen in FIG. 10, of the path of vertical movement of the reset lever finger 87 whereby depression of the reset lever 84 can in no way affect the relay mechanism thus making the relay tamper-free. Also, the actuator tongue 74 is withdrawn from the movable contact portion 22 as previously described to close a control circuit through the relay.

IN FIGS. 1 through 6, the relay elements are shown in the positions assumed after a tripping action initiated by one tripping device 38, the one to the right as seen in FIG. 2. Thus, the presence of an overload has caused the alloy holding the corresponding ratchet 36 against rotation to fuse thus freeing the ratchet 36 and in effect disengaging the pawl ear 44. The spring 45 is then freed to rotate the body 41 in a clockwise direction as seen in FIG. 2 or toward operating position. In the course of this movement, the arm 42 engages the corresponding pin 60 to carry the trip member 48 to the left as seen in FIG. 2 or toward tripped position, the space normally existing between the arm 42 and pin 60 allowing the arm 42 to accelerate rapidly to have a snap action.

As the trip member 48 moves toward tripped position, the trip member ear 54, which constitutes a driving portion of the trip member 48, engages the actuator ear 73 to drive the actuator 70, against the spring 59, to the right as seen in FIG. 1 or to its actuating position. At the same time, the pin 61 is moved from its blocking engagement with the indicator 62 to allow the spring 69 to move the indicator 62 upwardly so that the portion 66 extends through the cover 2 and is clearly visible to indicate that a tripping action has occurred.

As the actuator 70 moves toward actuating position, the tongue 74 engages the moveable contact portion 22 to move the movable contact 23 from the stationary contact 18 thus breaking a control circuit through the relay. Also, the cocking lever 75 and arm 77 move with the actuator 70 so that the finger 79 is brought into the vertical path of the reset finger 87.

Although in FIGS. 1 through 6 only one tripping device 38 is shown as having moved to operating position, it should be apparent that the same action will result should the other device 38 so move, or should a third such device, if provided, so move, or should any two or more devices so move. Thus, the relay mechanism proper is responsive to an overload in any one or more load lines.

The slots 80 in the arm 77 provide a lost motion connection that is useful in providing a fully trip-free relay mechanism and constitute one means to prevent the mechanism from being blocked should the reset lever 84 have been accidentally or intentionally depressed prior to the occurrence of a tripping condition. That is should the reset lever 84 be depressed while the actuator 70 is in retracted position, the reset finger 87 will be moved into a blocking position with respect to the horizontal path of movement of the cocking arm finger 79 with the actuator 70 and might thus prevent the actuator 70 from completing its movement to actuating position. In the embodiment of the invention shown herein, the slots 80 compensate for blocking by allowing some relative motion between the arm 77 and lever 75 thus allowing the lever 75, and the actuator 70, to complete their movement even when the cocking arm finger 79 is blocked by the reset finger 87. This type of lost motion connection, which is described more fully in the co-pending application of Gerd C. Boysen, Serial No. 32,372, is advantageous but does not form a part of this invention as such. A satisfactory trip-free action from this standpoint can also be secured by providing a slightly longer path of travel for the actuator 70 so that even when the movement of the actuator 70 is interrupted by a blocking engagement the shortened movement is sufficient to break the control circuit.

After a tripping action, and when it is desired to reset the relay mechanism, the reset cap 89 is depressed to force the reset finger 87 downwardly against the cocking arm finger 79, and the relay elements then assume the positions shown in FIGS. 7 through 9. Thus, as the finger 87 is moved downwardly the lever 75 is pivoted about the pin 76 in a clockwise direction as seen in FIG. 7 during which movement the lower apex of the lever 75 engages the trip member tongue 56 to move the trip member 48 to the left as seen in FIG. 7 or toward its cocked position. A resultant force acting through the lever 75 serves to hold the actuator 70 in actuating position throughout movement of the trip member 48 toward cocked position thus keeping the control circuit open during resetting to prevent damage in the case of a continuing overload and, therefore, to have a trip-free action. The relative movement between the trip member 48 and actuator 70 further compresses the spring 59.

As the trip member 48 moves toward cocked position, the pins 60, or 61, engage the operating arms 42 of whichever tripping device or devices 38 may have moved to operating position to pivot the same against the springs 45 in a counterclockwise direction as seen in FIG. 8, or toward latched position, wherein the pawl ears 44 are again in a position to engage the ratchets 36. The trip member 48 is arranged to have an overtravel, that is to move beyond its cocked position during a resetting action. This overtravel insures that the pawl ears 44 are moved far enough to have a secure engagement with the ratchets 36 and also allows the trip member 48 to return to cocked position leaving the aforementioned acceleration space between the arms 42 and pins 60, 61.

As the trip member 48 moves toward cocked position, the pin 61 engages the cam surface 65 of the indicator 62 to return the indicator 62 to its normal withdrawn position.

At the conclusion of the resetting action, the reset lever 84 is released, and the various elements will assume positions dependent on the ratchets 36. That is, if one or more ratchets 36 remains free to rotate the relay mechanism will return to the condition shown in FIGS. 1 through 6. If, however, the alloy holding the ratchets 36 has cooled and solidified the mechanism will return to the condition of FIGS. 10 through 12 with the spring 59 moving the actuator 70 to retracted position and the trip member 48 to cocked position and the spring 88 moving the reset lever 84 upwardly.

To summarize, the relay of this invention includes a trip-free, tamper-free mechanism, comprising the trip member 48, the actuator 70, the contacts 18 and 23, the cocking lever 75, the reset lever 84 and their associated elements, which is operable by any one of a number of tripping devices 38. The relay mechanism and tripping devices 38 are mounted on the base 1 whereby they may be assembled, tested and even replaced as a unit. The thermal units 25 and terminals 30 are mounted on the cover 2 whereby they may be easily installed, connected and replaced. The base 1 and cover 2 are provided with keys and keyways to locate and hold them in their proper relative positions during assembly. A single bias means, the spring 59, serves to bias both the trip member 48 and actuator 70 toward their normal positions thus making it unnecessary to provide two separate bias means which might become unbalanced after long use. The trip member 48 has an overtravel to insure effective resetting of the tripping devices 38 and to provide acceleration space for the arms 42. The torsion spring 45 also serves to hold the tripping device body 41 and pawl 43 in proper position.

Although the specific embodiment of the invention shown herein utilizes a single set of normally closed control circuit contacts mounted in the right-hand contact housing portion 4 as seen in FIG. 1, it should be noted that the opposite contact housing portion 4 is also adapted to receive contacts should a normally open control circuit be desired. In such use the actuator tongue portion 74 may be mounted upon the opposite end of the actuator 70. Alternatively, it may be desirable to use two sets of control circuit contacts one set mounted in each contact housing portion 4.

A preferred embodiment of the invention has been shown and described herein, but it should be apparent that a number of variations are possible within the scope of the invention. For example, well-known condition responsive devices other than the thermal units 25, such as solenoids, could be used so that the relay may be made responsive to a wide variety of electrical or other conditions. Also, the relay mechanism need not be adapted to operate only electrical control circuit contacts and could readily be used to actuate fluid valves and the like. In view of these and the other variations which might be made within the purview of the invention, the invention is not intended to be limited except insofar as such limitations appear in the following claims.

I claim:

1. In a relay the combination comprising: a supporting structure; a trip member mounted by said structure movable between cocked and tripped positions; an actuator mounted by said structure movable between retracted and actuating positions with a part in the path of movement of said trip member that is engageable by the trip member to be carried therewith as the trip member moves toward tripped position, the actuator thereby being carried to actuating position; spring means biasing said trip member to cocked position and said actuator to retracted position; a plurality of tripping devices each of which is movable independent of the others between latched and operating positions; means mounting said tripping devices on said supporting structure; a striking portion forming a part of each tripping device that is engageable with the trip member to carry the trip member toward tripped position upon movement toward operating position and then to be carried by the trip member toward latched position upon movement of the trip member toward cocked position, each striking portion being independent of said trip member to remain in its latched position when another of said tripping devices moves to its respective operating position; bias means urging each tripping device toward its operating position; and releasable restraining means for holding each tripping device in its latched position.

2. In a relay the combination comprising: a supporting structure; a plurality of tripping devices each movable independent of one another between latched and operating positions; means mounting said tripping devices on said supporting structure; means for releasably holding each of said tripping devices in its latched position; means to move each tripping device toward operating position; a trip member mounted by said supporting structure movable between cocked and tripped positions and having a part that is cooperatively engageable with each tripping device to be carried therewith upon movement of a tripping device toward operating position, the trip member thereby being carried toward tripped position, and to carry the tripping devices toward latched position upon movement of the trip member toward cocked position; an actuator mounted by said supporting structure movable between retracted and actuating positions and having a part co-operatively engageable by the trip member to be carried therewith upon movement of the trip member toward tripped position, the actuator thereby being carried toward actuating position; means to urge the actuator toward retracted position; and cocking means including a cocking lever mounted on and movable with the actuator and a reset lever engageable with the cocking lever only when the cocking lever has moved with the actuator to a position corresponding to the actuating position of the actuator, said reset lever upon engagement with the cocking lever causing the cocking lever to move the trip member toward cocked position while holding the actuator in actuating position.

3. In a relay the combination comprising: a supporting structure; a plurality of tripping devices each movable between latched and operating positions and having an operating arm thereon; means mounting said tripping devices on said supporting structure; means for releasable holding each of said tripping devices in latched position; means to move each tripping device toward operating position; a trip member mounted by said supporting structure movable between cocked and tripped positions and also movable in a resetting action that includes an overtravel beyond the cocked position, said trip member having a plurality of projections thereon and a driving portion, each of said projections being engageable with a corresponding tripping device operating arm whereby the trip member is carried from cocked position toward tripped position upon movement of any tripping device toward operating position, said projections being adapted to carry all of the tripping devices toward latched position upon movement of the trip member toward and beyond said cocked position; an actuator mounted by said supporting structure movable between retracted and actuating positions and engageable by the driving portion of the trip member to be carried therewith toward actuating position upon movement of the trip member toward tripped position; means to urge the actuator toward retracted position; cocking means to move the trip member toward and beyond cocked position into said overtravel; and means urging the trip member toward cocked position from its position of overtravel to hold the trip member in said cocked position.

4. In a relay the combination comprising: a base; a plurality of tripping devices each movable between latched and operating positions and having an operating arm thereon; means mounting said tripping devices on said base; a releasable current responsive unit for each tripping device for holding the device in latched position; means to move each tripping device toward operating position; a trip member mounted on the base and movable along a line of movement between tripped and cocked positions, said trip member having a driving portion and having a plurality of projections thereon each engageable with a corresponding tripping device operating arm whereby the trip member is carried toward tripped position upon movement of any tripping device toward operating position and is adapted to carry all of the tripping devices toward latched position upon movement of the trip member toward cocked position; an actuator mounted on the base and movable between retracted and actuating positions along a line substantially parallel to and spaced from the line of movement of the trip member, said actuator having a part engageable by the driving portion of said trip member when said trip member is moved to tripped position to have the actuator carried to its actuating position; cocking means to move the trip member toward and beyond cocked position to have an overtravel; and resilient bias means disposed in a cage formed in the base between the actuator and trip member and operating in one direction to urge the actuator toward retracted position and in the other direction to urge the trip member toward cocked position from its position of overtravel.

5. In a relay the combination comprising: a base; a trip member mounted on the base and movable along a line of movement between cocked and tripped positions and having a driving portion and a plurality of spaced projections thereon; an actuator mounted on the base and movable between retracted and actuating positions and being engageable by the driving portion of the trip member to be carried toward actuating position upon movement of the trip member toward tripped position; cocking means to move the trip member toward cocked position; a plurality of releasable catches; and a plurality of tripping devices, each movable between latched and operating positions and comprising a body portion pivotally mounted on a shaft extending from the base at a point removed from the line of movement of the trip member, a latch member disposed about the shaft between the body portion and the base and engageable with a corresponding catch, holding means on the free end of the shaft to hold the body portion thereon, a resilient torsion spring disposed about the shaft between the latch member and the base and operating between the base and body portion to urge the tripping device toward operating position, said torsion spring being axially compressed to hold the latch member and body portion tightly against the holding means, and an operating arm extending from the body portion into the line of movement of the trip member and engageable with a corresponding projection whereby the trip member is carried toward tripped position upon movement of the tripping device toward operating position and the tripping device is carried toward latched position upon movement of the trip member toward cocked position.

6. A relay according to claim 5 wherein the base comprises a floor, a central relay mechanism housing portion above the floor and a pair of upstanding keys on opposite sides thereof; and the trip member, actuator and tripping devices are mounted on the housing portion; and there is a cover releasably secured atop the base with downwardly extending walls which surround the perimeter of the base, said walls having cutout portions corresponding to the keys and through which the keys extend; and the catches are mounted on the cover; and the cocking means comprises a cocking lever mounted on the actuator and a reset lever mounted on the base and extending through the cover.

7. In a multi-pole relay the combination comprising: a supporting structure including a pair of spaced spring seats; a trip member having a pair of spaced ears which is supported by said structure and movable back and forth between a tripped position and a resetting position, and having a cocked position intermediate the tripped and resetting positions; spring means disposed between said spaced spring seats cooperatively engageable with one ear of said trip member for urging the same into said cocked position and also cooperatively engageable with the other ear of said trip member for resiliently holding the trip member in said cocked position; an actuator supported by said structure that is engaged by and movable with said trip member when the latter is moved to said tripped position, and which is retractable into a retracted position; relay contacts operated by said actuator movements; and a plurality of tripping devices supported by said structure that have latched positions and are each adapted to strike and move said trip member from cocked position to tripped position, and are returned to latched position upon movement of said trip member to its resetting position, said tripping devices when in latched position being disengaged from said trip member when it is in its cocked position.

8. A multi-pole relay as in claim 7 wherein said actuator has an ear cooperatively engageable by said spring means which thereby urges said actuator into said retracted position.

References Cited by the Examiner
UNITED STATES PATENTS

| | | | |
|---|---|---|---|
| 1,703,439 | 2/1929 | Dreyer | 200—124 |
| 1,752,514 | 4/1930 | Van Valkenburg | 200—124 |
| 1,966,926 | 7/1934 | Darnell et al. | 200—124 |
| 2,555,801 | 6/1951 | Mallory | 200—168 |
| 2,743,326 | 4/1956 | Matthias | 200—124 |
| 2,803,722 | 8/1957 | Kuhn | 200—124 |
| 2,810,048 | 10/1957 | Christensen | 200—168 |
| 2,811,607 | 10/1957 | Dorfman et al. | 200—116 |
| 3,053,958 | 9/1962 | Geissneri et al. | 200—168 |
| 3,096,416 | 7/1963 | Boysen | 200—124 |

BERNARD A. GILHEANY, *Primary Examiner.*